July 21, 1970 E. G. BROOKS ET AL 3,521,269

TRACKING ANALOG TO DIGITAL CONVERTER

Filed Dec. 20, 1965 5 Sheets-Sheet 1

INVENTORS
EVERETT G. BROOKS
JOHN S. GENTELIA

BY Richard H. Smith
ATTORNEY

TRACKING ANALOG TO DIGITAL CONVERTER

Filed Dec. 20, 1965 5 Sheets-Sheet 5

| COUNT (M) | AVE f (kc) | Δf | APPROX. TIME (ms) | APPROX TOTAL TIME (ms) | AVE. UNITS OF $E_{fb}$ | AVE. UNITS OF $E_e$ |
|---|---|---|---|---|---|---|
| 0-99 | 115 | – | .9 | .9 | 50 | 1150 |
| 100-199 | 105 | 10 | .95 | 1.8 | 150 | 1050 |
| 200-299 | 95 | 10 | 1.0 | 2.8 | 250 | 950 |
| 300-399 | 85 | 10 | 1.2 | 4.0 | 350 | 850 |
| 400-499 | 75 | 10 | 1.3 | 5.3 | 450 | 750 |
| 500-599 | 65 | 10 | 1.5 | 6.8 | 550 | 650 |
| 600-699 | 55 | 10 | 1.8 | 8.6 | 650 | 550 |
| 700-799 | 45 | 10 | 2.2 | 10.6 | 750 | 450 |
| 800-899 | 35 | 10 | 2.9 | 13.7 | 850 | 350 |
| 900-999 | 25 | 10 | 4.0 | 17.7 | 950 | 250 |
| 1000-1099 | 15 | 10 | 6.7 | 24.4 | 1050 | 150 |
| 1100-1109 | 9.5 | | 1.1 | 25.5 | 1105 | 95 |
| 1110-1119 | 8.5 | | 1.2 | 26.7 | 1115 | 85 |
| 1120-1149 | 6.5 | 10 | 4.6 | 31.3 | 1135 | 65 |
| 1150-1189 | 3.0 | | 13.3 | 44.6 | 1170 | 30 |
| 1190-1199 | .5 | | 20.0 | 64.6 | 1195 | 5 |

PRIOR ART

FIG. 10a

| | | | | | | |
|---|---|---|---|---|---|---|
| 0-99 | 119.99+ | – | 0.83 | 0.83 | 50 | 1150 |
| 100-199 | 119.99+ | 0 | 0.83 | 1.7 | 150 | 1050 |
| 200-299 | 119.99+ | 0 | 0.83 | 2.5 | 250 | 950 |
| 300-399 | 119.99+ | 0 | 0.83 | 3.3 | 350 | 850 |
| 400-499 | 119.99+ | 0 | 0.83 | 4.1 | 450 | 750 |
| 500-599 | 119.99+ | 0 | 0.83 | 4.9 | 550 | 650 |
| 600-699 | 119.99+ | 0 | 0.83 | 5.7 | 650 | 550 |
| 700-799 | 119.99+ | 0 | 0.83 | 6.5 | 750 | 450 |
| 800-899 | 119.99+ | 0 | 0.83 | 7.3 | 850 | 350 |
| 900-999 | 60.6 | 59 | 1.7 | 9.0 | 950 | 250 |
| 1000-1099 | 30.5 | 30 | 3.3 | 12.3 | 1050 | 150 |
| 1100-1109 | 22.3 | | .4 | 12.7 | 1105 | 95 |
| 1110-1119 | 17.7 | | .6 | 13.3 | 1115 | 85 |
| 1120-1149 | 13.9 | 30 | 2.6 | 15.9 | 1135 | 65 |
| 1150-1189 | 6.6 | | 6.1 | 22.0 | 1170 | 30 |
| 1190-1199 | 1.6 | | 6.3 | 28.3 | 1195 | 5 |

FIG. 10b

| COUNT (M) | f(kc) | Δf | APPROX TIME (ms) | APPROX TOTAL TIME (ms) | UNITS OF $E_{fb}$ | UNITS OF $E_e$ | "ON" TIME FOR "1" SWITCH OF EACH DECADE (ms) $10^3$ | $10^2$ | $10^1$ | $10^0$ |
|---|---|---|---|---|---|---|---|---|---|---|
| 0-99 | 120 | – | .83 | .83 | 0 | 1200 | 8.3 | .83 | .083 | .0083 |
| 100-199 | 120 | 0 | .83 | 1.7 | 0 | 1200 | 8.3 | .83 | .083 | .0083 |
| 200-299 | 120 | 0 | .83 | 2.5 | 0 | 1200 | 8.3 | .83 | .083 | .0083 |
| 300-399 | 120 | 0 | .83 | 3.3 | 0 | 1200 | 8.3 | .83 | .083 | .0083 |
| 400-499 | 120 | 0 | .83 | 4.1 | 0 | 1200 | 8.3 | .83 | .083 | .0083 |
| 500-599 | 120 | 0 | .83 | 4.9 | 0 | 1200 | 8.3 | .83 | .083 | .0083 |
| 600-699 | 120 | 0 | .83 | 5.7 | 0 | 1200 | 8.3 | .83 | .083 | .0083 |
| 700-799 | 120 | 0 | .83 | 6.5 | 0 | 1200 | 8.3 | .83 | .083 | .0083 |
| 800-899 | 120 | 0 | .83 | 7.3 | 0 | 1200 | 8.3 | .83 | .083 | .0083 |
| 900-999 | 120 | 0 | .83 | 8.1 | 0 | 1200 | 8.3 | .83 | .083 | .0083 |
| 1000-1099 | 20 | 100 | 5.0 | 13.1 | 1000 | 200 | 50 | 5 | .5 | .05 |
| 1100-1109 | 10 | | 1.0 | 14.1 | 1100 | 100 | 100 | 10 | 1.0 | .1 |
| 1110-1119 | 9 | | 1.1 | 15.2 | 1110 | 90 | 110 | 11 | 1.1 | .11 |
| 1120-1149 | 7(AVE) | 20 | 4.2 | 19.4 | 1135(AVE) | 65(AVE) | 140 | 14 | 1.4 | .14 |
| 1150-1189 | 3.5(AVE) | | 11.4 | 30.8 | 1170(AVE) | 30(AVE) | 290 | 29 | 2.9 | .29 |
| 1190-1199 | .5(AVE) | | 20.0 | 50.8 | 1195(AVE) | 5(AVE) | 2000 | 200 | 20 | 2.0 |

FIG. 10c

United States Patent Office 3,521,269
Patented July 21, 1970

3,521,269

TRACKING ANALOG TO DIGITAL CONVERTER

Everett G. Brooks and John S. Gentelia, Rochester, Minn., assignors to International Business Machines Corporation, Armonk, N.Y., a corporation of New York Filed Dec. 20, 1965, Ser. No. 514,874
Int. Cl. H03k *13/02*
U.S. Cl. 340—347 11 Claims

ABSTRACT OF THE DISCLOSURE

An analog to digital converter has a voltage-controlled, variable-frequency oscillator for producing pulses to increment a low-order stage of a counter for storing digital values. The counter output is converted to a first analog signal by a digital to analog converter. This analog signal is subtracted from the analog input signal to produce a second analog signal. The polarity of the second signal controls the direction in which the counter is incremented, while its magnitude controls the frequency of the oscillator. To improve convergence speed, the oscillator frequency is made a nonlinear function of the difference between the analog input signal and the counter output representation. In a first embodiment, this nonlinearity is introduced by making the oscillator frequency nonlinear with respect to the second analog signal. In a second embodiment, the first analog signal is made nonlinear with respect to the counter output representation by means of a plurality of delays incorporated in the digital to analog converter.

This invention relates to tracking-type analog to digital converters and, more particularly, to tracking analog to digital converters of the "closed loop" type wherein a counter is driven to approximate the value of an analog signal in response to a difference or error signal which is derived by taking the difference between the magnitude indicated by the counter output and that of the analog input signal.

Early analog to digital converters of the type described employed fixed frequency pulse generators to drive the counter. The generator was turned on whenever there was any appreciable error signal from the input differential amplifier and was turned off when the error signal was reduced to zero by the counter feedback. Operation of this converter thus consists of driving the counter output so as to cause it to be continually converging on the varying analog input signal. The counter output therefore always provides a digital approximation of the magnitude of the analog input.

However, this fixed-frequency scheme is not suitable for tracking high frequency input signals, since the gain-bandwidth product of the difference amplifier limits the ability of the converter to accurately detect null points without overshoot or oscillation. The large bandwidth necessary in an amplifier suitable for high frequency tracking is thus prohibitive to practical, economical conversion.

It has been found that by employing a linear-transform variable frequency voltage controlled oscillator to drive the counter, the bandwidth of the input amplifier is rendered much less critical. In this system the rate of change of the counter feedback is proportional to the magnitude of the error signal. Thus, the rate of the feedback is great when the error signal is large and accuracy is not required of the input amplifier while when the error signal is small, indicating that a null point is approaching, the rate of the feedback is slowed down to a level which can be handled accurately by a relatively narrow bandwidth amplifier. Since the initial high rate of counter feedback reduces the overall convergence time, higher input frequencies can be accurately tracked using this variable frequency approach.

It is an object of the present invention to provide a tracking analog to digital converter of the variable-frequency type which is an improvement over the variable-frequency tracking converters taught by the prior art.

A further object is to provide a tracking analog to digital converter which further reduces the bandwidth requirements of the input amplifier over those of prior art converters and increases conversion speed, enabling higher frequency inputs to be tracked.

In accordance with the invention, pulses are supplied to drive the tracking counter in such a manner that the counter is incremented at a rate which is non-linearly variable with respect to changes in the difference between the magnitude represented by the counter output and the magnitude of the analog input signal. In a first illustrative embodiment of the invention, this principle is implemented through the use of a pulse generator which produces counter drive pulses having a repetition rate which is non-linearly variable with respect to changes in the magnitude of the difference signal issued by the input difference amplifier. In a second illustrative embodiment, this principle is implemented through the use of means for generating a non-linear feedback signal from the counter output to the input differential amplifier.

The foregoing and other objects, features and advantages of the invention will be apparent from the following more particular description of preferred embodiments of the invention, as illustrated in the accompanying drawings.

FIGS. 10*a*, 10*b* and 10*c* are tables listing the data upon which the graphs of FIGS. 6 through 9 are based.

GENERAL DESCRIPTION

Figure 1:
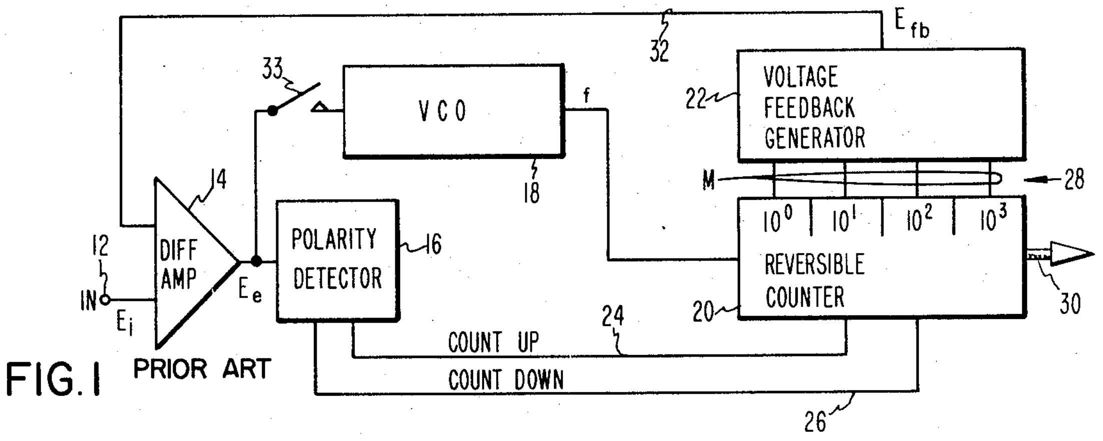
FIG. 1 is a schematic diagram showing the overall arrangement of components in a tracking analog to digital converter constructed in accordance with the general principles of the invention.

FIG. 1 schematically depicts a tracking-type analog to digital converter. An analog input signal $E_i$ is presented on input terminal 12 to the first input of a differential amplifier 14. The amplifier error signal $E_e$ is transmitted to a variable frequency voltage controlled oscillator 18 and to a polarity detector 16. The output of VCO 18 is a pulse train having a frequency or repetition rate *f* established in accordance with the magnitude of the error signal $E_e$. These pulses are fed to a reversible counter 20 where they are employed to increment the counter through the low-order stage thereof. Polarity detector 16 presents a "count up" signal on line 24 when $E_e$ is positive. This signal conditions counter 20 to increment in the positive direction in response to the pulses *f*. When $E_e$ is detected to be negative by detector 16 it issues a "count down" signal on line 26 to condition counter 20 to increment in the negative direction in response to the pulses *f*.

The digital value of the count contained in counter 20 at any given instant is represented by the letter M and is manifested by signals on counter output lines 28. An output line 30 presents the same count information to external utilization means such as a recorder, display device, etc. The digital output on the lines 28 is fed to a voltage feedback generation circuit 22, which converts the digital value M to an analog feedback signal $E_{fb}$. $E_{fb}$ is fed back via line 32 to the second input of differential amplifier 14.

Variations in the magnitude of the input signal $E_i$ induce changes in the magnitude of $E_e$. In the present invention, these changes cause the repetition rate of the pulses $f$ to vary as a non-linear function of the difference between $E_i$ and M. As the pulses $f$ drive the counter the magnitude of $E_{fb}$ is made to vary and, as negative feedback, reduces the magnitude of $E_e$ toward zero. Thus, assuming the magnitude of both $E_i$ and M to be initially 0, $E_{fb}$ and $E_e$ are also 0. If $E_i$ is suddenly increased to a value of, for example, +100 units, the difference between $E_i$ and M becomes 100, as does the magnitude of $E_e$. VCO 18 responds by issuing counter drive pulses $f$ of some predetermined repetition rate. Counter 20 begins counting positively in response thereto and the value of M increases with each pulse $f$. As M increases, the magnitude of $E_{fb}$ builds up so that $E_e$ is reduced. Because of the non-linear drive feature, the repetition rate of $f$ is reduced slowly at first and then is reduced more rapidly as M "converges" on the magnitude of $E_i$. At the time of convergence $E_e$ is 0 and the repetition rate of the pulses $f$ is also 0, maintaining the value of M stationary and equal to 100, assuming no change occurred in the magnitude of $E_i$.

A measure of the "speed" of the converter, and hence its ability to track high frequency analog inputs, may be determined by the time it takes the counter output M to converge in response to a substantially instantaneous change in the magnitude of $E_i$ equal to the full converter input range. Thus, if the input range is 1200 units, response time can be measured by opening switch 33, setting M to zero and applying a maximum positive input signal equal to 1200 units on terminal 12. The response capabilities of the converter are thus determined by measuring the amount of time it takes M to progress to substantially 1200 once switch 33 is closed.

In the previously generally discussed prior art converter employing a variable frequency voltage controlled oscillator with a linear transform, $f$ is a linear function of the difference between $E_i$ and M. This is demonstrated as follows. Since the feedback voltage $E_{fb}$ is generated by a conventional digital to analog conversion (DAC) network, such as a binary-weighted voltage divider, $E_{fb}$ varies in direct proportion to changes in M and consequently $\Delta E_{fb}/\Delta M$ is constant with respect to time. Stated in another way, $E_{fb}$ is a linear function of M. In view of this it may be said that the magnitude of the error signal $E_e$ is a linear function of the difference between the value of $E_i$ and M, i.e., $\Delta E_e/\Delta(E_i-M)$ is constant with respect to time. Since the VCO of the prior art converter is known to have a linear transform, $\Delta f/\Delta E_e$ is also known to be constant with respect to time and it therefore follows that $\Delta f/\Delta(E_i-M)$ is constant with respect to time, meaning that the repetition rate of the pulses $f$ is a linear function of the difference between the magnitude of $E_i$ and M.

Figure 2:
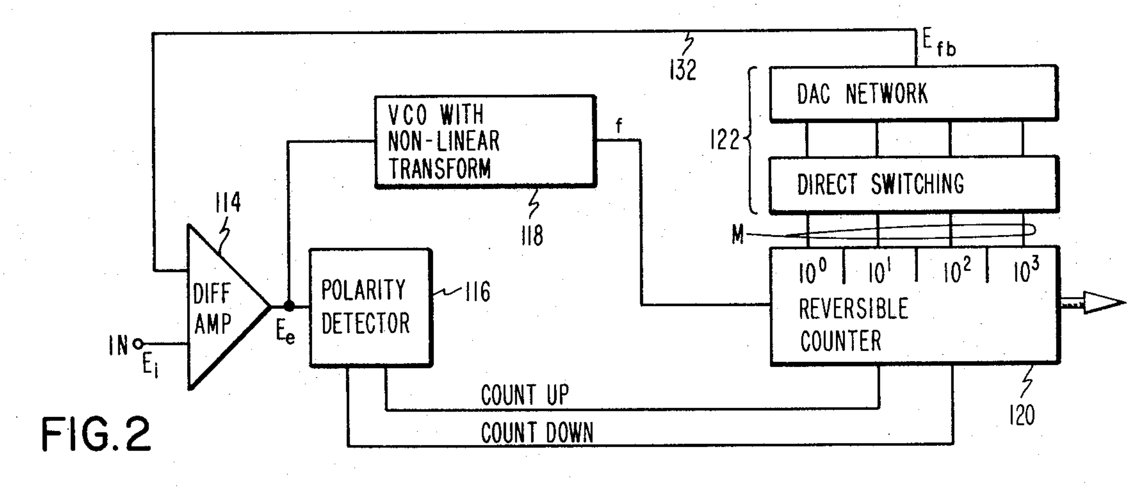
FIG. 2 is a schematic diagram illustrating a first embodiment of the invention employing a voltage controlled oscillator with a non-linear transform.
Figure 3:
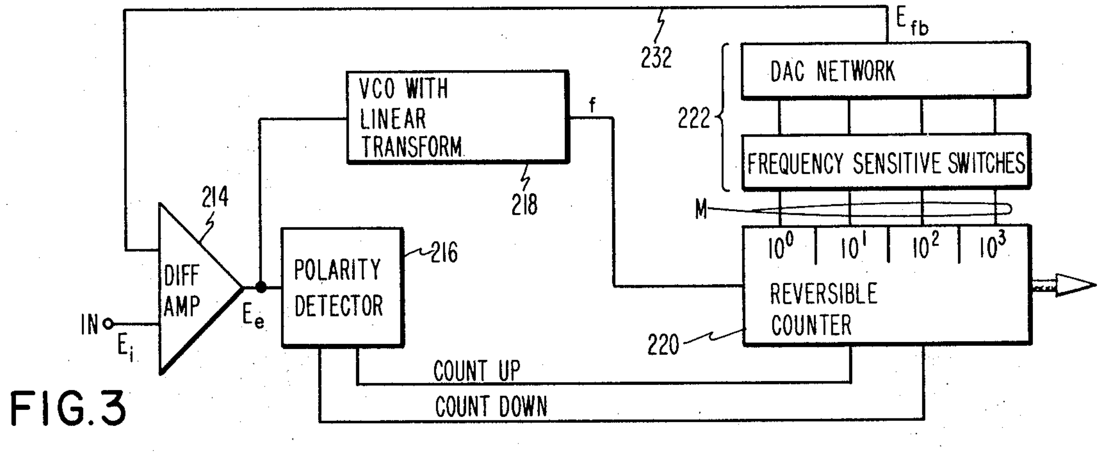
FIG. 3 is a schematic diagram showing a second embodiment of the invention employing means for generating a non-linear feedback signal from the counter output to the input differential amplifier.

In both embodiments of the invention, shown schematically in FIGS. 2 and 3, the repetition rate of the pulses $f$ is a non-linear function of the difference between the magnitude of $E_i$ and M, i.e., $\Delta f/\Delta(E_i-M)$ varies with respect to time. In the embodiment shown in FIG. 2, this relationship is accomplished by generating $E_{fb}$ as a linear function of M, as in the prior art, but employing a VCO with a non-linear, such as logarithmic, transform. This therefore means that $\Delta f/\Delta E_e$ varies with respect to time and that the overall relationship $\Delta f/\Delta(E_i-M)$ is non-linear. Generation of a linear feedback signal $E_{fb}$ is obtained by employing a conventional type of digital to analog conversion network controlled, in a conventional manner, by switches responding to changes in the counter output. Because of the non-linear characteristics in which the pulses $f$ are generated in response to $E_e$, the repetition rate of $f$ is maintained at a higher level for a greater percentage of the time required for convergence than if the VCO had a linear transform. As will be explained in more detail subsequently, this enables the counter output to progress to convergence in a materially shorter amount of time.

In the second embodiment, shown in FIG. 3, the non-linear characteristic between $f$ and $(E_i-M)$ is achieved by generating a non-linear feedback signal. $\Delta E_{fb}/\Delta M$ is variable with respect to time, i.e., non-linear. This makes the magnitude of error signal $E_e$ a non-linear function of the difference between $E_i$ and M, i.e., $\Delta E_e/\Delta(E_i-M)$ varies with respect to time. Thus, even though $\Delta f/\Delta E_e$ is constant with respect to time since a VCO with a linear transform is employed, the same non-linear relationship between $f$ and $(E_i-M)$ is achieved.

The required non-linear feedback signal is generated through the use of a DAC network which is controlled by frequency sensitive switches. This, as is explained in more detail subsequently, means that each switch of the DAC network does not operate to contribute to $E_{fb}$ until the rate of change of its corresponding counter output line slows down to some predetermined rate. Thus, in the initial stages of convergence, when $E_e$ is great and the repetition rate of $f$ is correspondingly high, only the DAC switches associated with the high-order ($10^3$) counter position (as will be described subsequently, a binary-coded-decimal DAC network requiring four input switches per decade is employed) change at a slow enough rate to have an effect on $E_{fb}$. No feedback is generated therefore until the counter progresses to a count of 1,000 and the counter is permitted to advance at the maximum rate in incrementing through over 90 percent ($^{11}/_{12}$) of the count required for convergence. After the initial thousand units of feedback are generated due to the operation of the DAC switches associated with the high-order counter position, the repetition rate of $f$ is reduced to a level where the DAC switches associated with the $10^2$ counter output position become effective to generate feedback. Thus, when the count reaches 1100, more feedback is added to slow the counter down even more to the point where the DAC switches associated with the $10^1$ counter output becomes operative. The amount of feedback is thus further increased when the count reaches 1110 and is thereafter increased each time the count reaches a multiple of 10 until approximately 1190 units of feedback have been built up. At this point the repetition rate of $f$ has dropped to a level where the DAC switches associated with the low-order counter position became operative. At this point feedback is generated in direct proportion to the count and thus the system operates linearly until convergence is reached.

DETAILED DESCRIPTION

FIG. 2 Embodiment

The circuit details of the converter generally shown in FIG. 2 are hereinafter described with reference to FIG. 4. Reversible counter 120 is of conventional design and may be, for example, of the binary-coded-decimal (BCD) type. The counter drive signal $f$ is received on line 119 from variable frequency, voltage controlled oscillator 118, each input pulse causing the low-order ($10^0$) decade of the counter to be incremented by one. Incrementing of the low-order decade controls the incrementing of higher order decades in accord with conventional BCD counter operation. The count magnitude is represented on 1, 2, 4 and 8 output lines from each counter decade. A count of 6, for example, is represented by binary "1" level pulses on the 2 and 4 output lines of the $10^0$ decade and "0" level signals on all other output lines. The counter 120 receives "count up" and "count down" signals on lines 124 and 126, respectively, from the polarity detection circuit 116. A signal on line 124 conditions appropriate transfer gates within the counter to permit the counter to be incremented positively in response to pulses on line 119. A signal on line 126 conditions the counter to increment negatively. Output bus 130 conveys parallel counter output data to external utilization circuitry such as a recorder, display, etc.

Each counter output line provides an input to DAC circuit 122 through a switch 140. Each switch is adapted to supply either of two reference potentials to the input resistor 145 to which it is connected. The DAC circuit is a conventional voltage dividing ladder wherein all of the resistors 145 are of equal value. The resistors 145 are connected to each other through resistors 146, which have resistance values related in suitable ratios to effect the proper BCD ladder weighting.

Since each of the DAC input switches 140 is identical, only one is shown in detail. An input transistor 143 is turned "on" or "off" in accordance with the signal level applied to its base by the associated counter output line. Complementary switching transistors 141 and 142 apply either a positive reference potential or ground, respectively, to the DAC input resistor 145 connected to their collectors.

When the counter output line is at the "0" level, transistor 143 becomes saturated causing its collector potential to drop substantially to the negative level of its emitter. This voltage drop saturates transistor 142 and biases transistor 141 into non-conduction, thus causing the ground reference potential applied to the collector of transistor 142 to be applied to the input resistor 145. When the input to transistor 143 changes to the "1" level, transistor 143 is turned off causing its collector voltage to rise, reversing the conduction states of the transistors 141 and 142. This connects the positive reference potential at the collector of transistor 141 to resistor 145.

When all counter output lines are set to the 0 level, all input resistors 145 are grounded and the voltage level on DAC output line 132 is thus ground, representing a count (M) of zero. When the positive reference potential is applied to the input resistors associated with the 1 and 8 output lines of each counter decade, the voltage on output line 132 is at a maximum level representative of a count of 9999. All other combinations of the states of input switches 140 representative of counts intermediate 0 and 9999 produce voltage levels of proportionate magnitude on line 132.

The voltage on line 132 is applied to the second input of the input differential amplifier 114. The output of the amplifier 114 represents the instantaneous difference between the feedback level on line 132 and the level of the analog input signal applied to input terminal 112. This difference or error voltage $E_e$ is applied both to the variable frequency, voltage controlled oscillator circuit 118 and to the polarity detection circuit 116.

The former supplies a train of pulses on output line 119 to drive the counter 120. The repetition rate or frequency $f$ of this pulse train is established by an astable multivibrator circuit comprising transistors 154 and 155 and is a function of the magnitude of the error signal present at the output of differential amplifier 114. The latter signal is applied to the base discharge resistors R of the astable multivibrator circuit through input stage transistors 1551 and 152 and emitter follower 153. Output pulses are taken from the collector of transistor 155 and applied to output line 119 through an output transistor 156.

The repetition rate $f$ of the output is determined approximately as follows:

$$f=\frac{1}{RC\ \ln\left(\frac{E_e+V_o}{E_e}\right)}$$

where $V_o$ is the voltage applied at terminal 157 and $E_e$ is the magnitude of the error signal as represented at the emitter of transistor 153.

In some instances, depending upon the circuit parameters employed in the circuit 118 and the output frequency range desired, it may be necessary to add inhibiting logic to positively force the output frequency of circuit 118 to zero when the magnitude of $E_e$ drops below some predetermined threshold level near zero. This is because of practical limitations on the input sensitivity of VCO 118.

The polarity detection circuit 116 is a two stage differential amplifier having a pair of emitter follower output transistors 169 and 170. The first amplifier stage comprises transistors 161 and 162 and the second stage comprises transistors 163 and 164. When the output from the amplifier 114 is positive, transistor 161 is biased further into conduction, biasing transistor 162 toward nonconduction. The voltage at the collector of the latter transistor rises, turning transistor 164 on, causing a drop in its collector potential. This turns transistor 166 off, causing transistor 167 to saturate. This action turns emitter follower 170 off, generating a positive-going signal on output line 126. Saturation of transistor 167 also turns transistor 168 off. This biases emitter follower 169 into saturation, causing its emitter voltage to drop to the negative level of its collector, generating a negative-going signal on output line 124. The combination of output signals thus produced on output lines 124 and 126 causes counter 120 to increment in a positive direction in response to the pulses $f$ on line 119.

When the polarity of the error signal at the output of amplifier 114 switches from positive to negative, the states of conduction of the transistors in the circuit 116 become the reverse of that above described and thus a positive-going signal is produced on output line 124 and a negative-going signal is produced on line 126. This conditions counter 120 to increment negatively in response to the pulses $f$.

Operation

Figure 4:
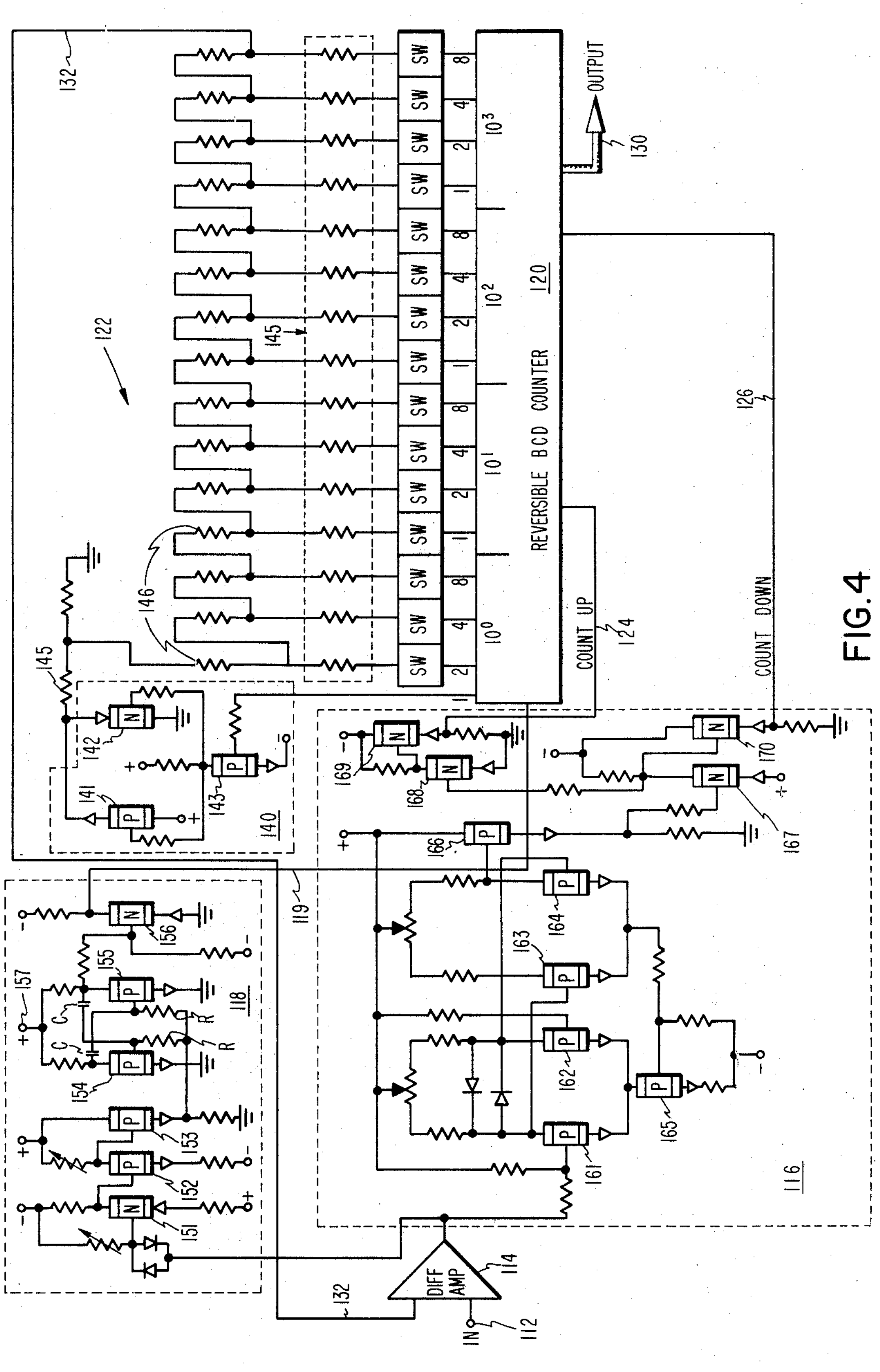
FIG. 4 is a schematic diagram showing the circuit details of the analog to digital converter of FIG. 2.

Operation of the circuit of FIG. 4 is hereinafter described and compared to the operation of prior art tracking converters with additional reference to FIGS. 6–9 and 10*a* and 10*b*. The particular mode of operation discussed is that of a single convergence in response to a positive "step function" input at terminal 112 of maximum amplitude. For purposes of illustration the converter input range is taken to be 1200 units. The "step-function" input thus goes from 0 to 1200, causing $E_e$ to vary from 1200 to 0. RC of the astable multivibrator of circuit 118 is taken to be $8.33\times10^{-4}$ while the value of $V_o$ of the same circuit is assumed to be 6 volts. The maximum repetition rate of the pulses $f$ from the circuit 118 is therefore 120 kc.

In the table of FIG. 10*b*, values are given to illustrate the performance of the converter during each of sixteen count intervals as the counter output converges on the input. Comparable data is presented in the table of FIG. 10*a* for a prior art converter employing both linear counter feedback and a voltage controlled oscillator with a linear transform. In FIG. 10*b* it is seen that as the counter output proceeds from 0 to 1200 the magnitude of $E_{fb}$ builds up linearly, that is, for every count interval of 100, 100 units of $E_{fb}$ are added. Since the level of $E_i$ is fixed at 1200, the magnitude of $E_e$ varies inversely with that of $E_{fb}$. Thus, $E_e$ decreases by 100 units with each 100 unit increase in the output of counter 120. These relationships are graphically depicted by the straight line functions $E_{fb}$ and $E_e$ of FIG. 8. Note that in FIG. 8 the parameter indicated on the abscissa is $E_i—M$. Since $E_i$ is held constant at 1200 in the present example, $E_i—M$ is simply the inverse of M.

By way of comparison it may be seen that the operation, as thus far explained, is exactly the same for the circuit of FIG. 4 as it is for the aforementioned type of prior art circuit. This is seen by comparing the two right-hand columns of the table of FIG. 10*b* with the same two columns of table of FIG. 10*a*. The reason for this similarity lies in the fact that both circuits employ linear feedback between the counter and the differential amplifier.

Since the oscillator 118 has a non-linear (logarithmic) response to the magnitude of $E_e$ in accordance with the previously stated logarithmic function, the repetition rate of the signal *f* begins at substantially the maximum of 120 kc. in response to the $E_e$ of 1200 and remains substantially constant at that level until the count reaches about 900. At that point the rate of change of *f* increases sharply, causing the repetition rate of *f* to decrease to 0 as convergence is approached. This non-linear behavior of *f* is depicted in the columns headed "Ave. *f* (kc.)" and "$\Delta f$" of FIG. 10*b*, and is graphically depicted by the curve A of FIG. 6. The linear behavior of the prior art circuit is illustrated in FIG. 10*a* and by curve B. The data of FIG. 10*b* further clearly illustrates the fact that the overall relationship $\Delta f/\Delta\ (E_i—M)$ with respect to time in the circuit of FIG. 4 is non-linear while, as shown in FIG. 10*a*, the same relationship for the prior art converter is linear. As previously mentioned the rate of change of $E_i—M$ is the same as M in the present example since $E_i$ is held constant. This overall relationship is graphically depicted in FIG. 7 where curve A illustrates the relationship pertaining in the circuit of the invention while curve B illustrates the relationship as it exists in the prior art circuit.

Figure 9:
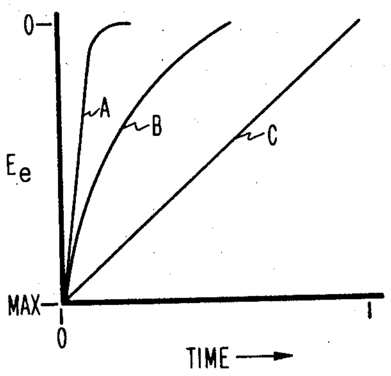

FIG. 9 illustrates the relationship between $E_e$ and time for two types of prior art circuits (curves B and C) and for the circuits of the invention (curve A). The straight line C depicts the operation of the early type prior art converter having a fixed frequency oscillator. Curve B depicts the operation of the prior art converter having a linear transform oscillator and is based upon the data shown in columns 4 and 5 of the table of FIG. 10*a*. Note that performance is effectively twice that of the earlier type converter. Curve A depicts the operation of the converter of FIG. 4 and is based upon the data listed in columns 4 and 5 of the table of FIG. 10*b*. Speed is at least doubled with respect to the converters of the prior art. This means that since the response time required by the converter of the invention to converge upon a step-function input is materially less, the ability of the converter to track high frequency inputs is substantially improved.

FIG. 3 Embodiment

Figure 5:
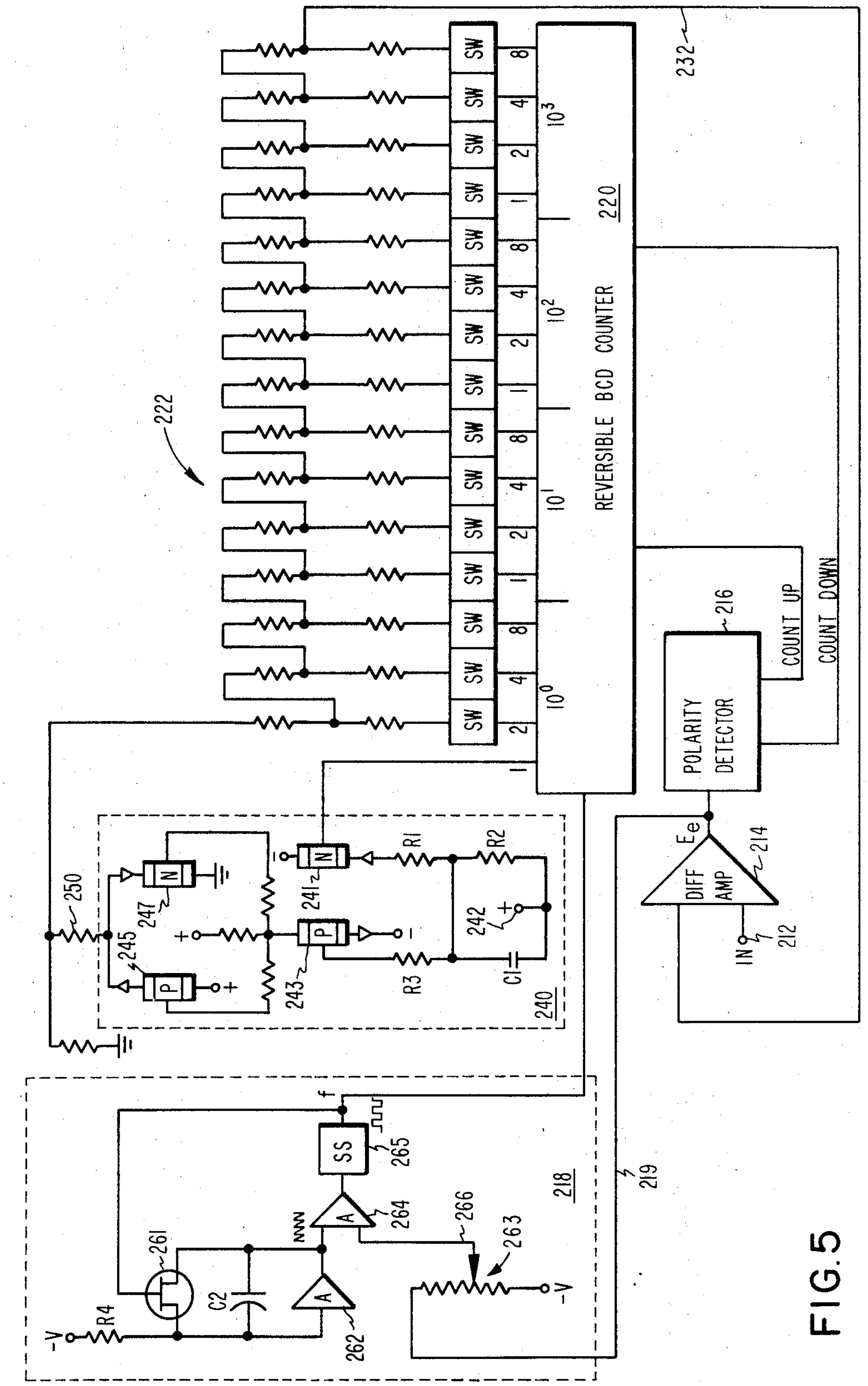
FIG. 5 is a schematic diagram showing the circuit details of the analog to digital converter of FIG. 3.
Figure 6:
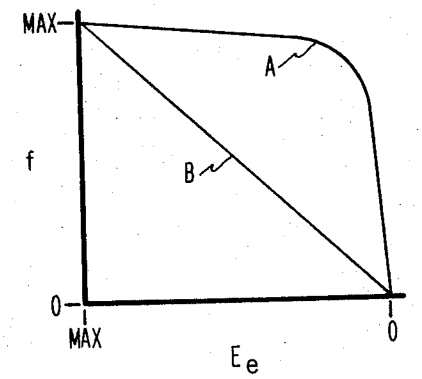
FIGS. 6, 7, 8 and 9 are diagrams graphically illustrating the performance of the analog to digital converters of the invention, comparing them with the performance of prior art converters.
Figure 7:
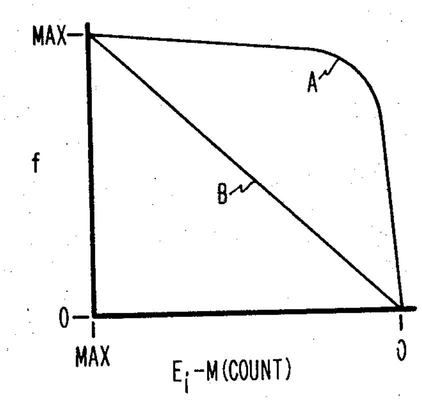
Figure 8:
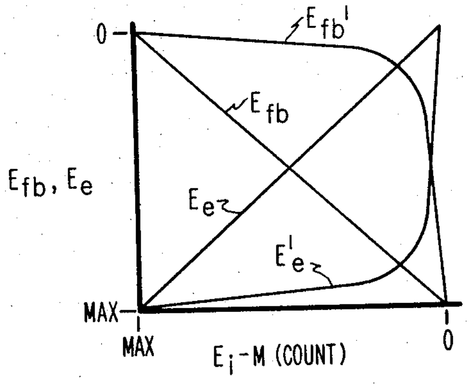

With reference to FIG. 5 the details of the converter generally shown in FIG. 3 are hereinafter described.

The input differential amplifier 214, reversible BCD counter 220 and DAC voltage divider network 222 are of conventional design, as in the circuit previously described in connection with FIG. 4. Polarity detector 216 is identical to the circuit 116 also described in connection with FIG. 4.

Non-linear feedback from the counter to the input amplifier 214 is generated through the use of frequency-sensitive switches 240 at the inputs to DAC network 222. Since each switch is substantially identical, only one circuit is shown in detail. The switch comprises an input transistor 241 coupled to a switch control transistor 243 by a time delay network including resistors R1, R2 and capacitor C1. Transistor 243 controls a pair of switching transistors 245 and 247 to apply either a positive reference potential or ground to the connected DAC input resistor 250.

When the "1" output line of the low-order decade of counter 220 is in a state indicative of a binary 0, transistor 241 is biased to non-conduction, causing transistor 243 to be held in conduction by current supplied from the positive potential at terminal 242 through resistors R2 and R3. The negative potential at the emitter of transistor 243 is thus applied to the bases of transistors 245 and 247, biasing the latter on and the former off. This applies ground to input resistor 250. When the counter output line switches to a state indicative of a binary 1, transistor 241 is biased into conduction and the voltage at the base of transistor 243 begins dropping at a rate determined by the time constant of R1, R2 and C1. If transistor 241 is held in conduction for a period longer than some predetermined length dependent upon the time constant, transistor 243 is turned off, reversing the states of transistors 245 and 247 and applying the positive reference voltage to input resistor 250. However, if the level of the counter output line switches back to that indicative of a binary 0 prior to the expiration of the predetermined time period, transistor 243 is maintained in its conductive state, preventing the positive input level from being applied to resistor 250.

From this it is apparent that unless the "on" time (time during which a binary 1 is represented) of each of the counter outputs is held for at least a predetermined length of time the outputs are not effective to generate a feedback voltage through their associated DAC resistors. Since the on time for each counter output line increases as the rate of counter advancement decreases, the values of R1, R2 and C1 may be chosen so that the counter output lines associated with the $10^0$, $10^1$ and $10^2$ decades are prevented, at the higher repetition rates of the signal *f*, from contributing to the magnitude of $E_{fb}$. As the rate of *f* decreases the lower order counter outputs are successively "enabled" by decades, causing $E_{fb}$ to build up at an increasingly faster rate. This action of the switches 240 causes the generation of non-linear feedback to differential amplifier 214 and accomplishes substantially the same speed-up results obtained in the circuit of FIG. 4 through the use of a non-linear transform VCO.

The variable frequency, voltage controlled oscillator 218 has a linear transform and therefore generates counter drive pulses *f* having a repetition rate which is a linear function of the magnitude of $E_e$ applied on input line 219 from the output of differential amplifier 214. This input signal is applied to calibration potentiometer 263 which is tied to a negative reference level —V. As the magnitude of $E_e$ increases, the negative level applied via tap 266 to one input of a differential amplifier 264 decreases (becomes more positive). The second input to amplifier 264 is supplied from an integrating amplifier 262 connected to a negative potential source —V through a resistor R4. Capacitor C2 of the integrator is shunted by a field effect transistor 261 which is normally in a non-conducting state. The gate of transistor 261 is fed from a single-shot multivibrator 265 controlled by the output from amplifier 264. This feedback connection produces an output from amplifier 262 which is a negative-going sawtooth waveform having a frequency proportional to the magnitude of $E_e$. This waveform is generated as follows: capacitor C2 charges through resistor R4, causing a negative ramp to appear at the output of amplifier 262. When the voltage level of this ramp reaches the negative level present at tap 266, the output of differential amplifier 264 reaches zero and triggers single-shot 265. The pulse thus issuing from circuit 265 is fed to counter 220 to increment the low order position thereof and also, through the aforementioned feedback connection, causes transistor 261 to conduct and discharge capacitor C2. This returns the output of amplifier 262 in a positive direction to its starting potential and, when the pulse from single-shot 265 terminates, allows capacitor C2 to again begin charging through R4 to begin another cycle. Thus, as $E_e$ becomes greater, the amplitude of the sawtooth decreases in proportion to the change in the switching level established at tap 266 and the frequency of the sawtooth increases proportionately. Since the repetition rate of pulses from single-shot 265 is the same as the frequency of the sawtooth, the repetition rate of the counter drive pulses $f$ is a linear function of the magnitude of $E_e$.

Operation

The operation of the converter of FIG. 5 is hereinafter described with additional reference to FIGS. 6–9 and 10*c*. The mode of operation is again taken to be that of a single convergence on a step-function analog input signal of maximum magnitude. The period of "delay" built into the "1" switch 240 of each decade is set at one millisecond, meaning that the corresponding counter output lines, in order to induce feedback, must remain in a binary 1 condition for at least 1 millisecond. The "2" switch of each decade has a delay of 2 milliseconds while the "4" and "8" switches have delays of 4 and 8 milliseconds, respectively.

At the instant that $E_i$ becomes 1200 units large, $E_e$ also rises to 1200 since the counter output is at 0 and no feedback signal $E_{fb}$ is present. At the outset, therefore, the repetition rate of the pulses $f$ from oscillator 218 is the maximum of 120 kc. As shown in columns 8–11 of the table of FIG. 10*c*, this repetition rate establishes the following "on" times for the "1" switches associated with each of the four different counter output decades: 8.3 ms. for the "1" switches in the $\mathbf{10^3}$ decade, .83 ms. for the "1" switches in the $\mathbf{10^2}$ decade, .083 ms. for "1" switches in the $\mathbf{10^1}$ decade and .0083 ms. for the "1" switches in the $\mathbf{10^0}$ decade. The "on" times of the 2, 4 and 8 switches of each decade may be determined by multiplying the "on" time of the appropriate "1" switch by 2, 4 and 8, respectively. Thus the only switches which remain on long enough to effect the generation of feedback from DAC network 222 when the counter is being driven at 120 kc. are those in the $\mathbf{10^3}$ counter decade. The counter thus proceeds to a count of 1000 before any feedback is generated. This permits the oscillator 218 to generate counter drive pulses of maximum frequency for $^{11}/_{12}$ of the count interval required for convergence. This period of the cycle is therefore covered in the shortest possible time.

When a count of 1000 is reached, the switch 240 associated with the "1" output line of the $\mathbf{10^3}$ counter decade is turned on and causes 1000 units of feedback to be fed to differential amplifier 214. This reduces $E_e$ to 200 units, proportionately lowering the frequency of the pulses $f$ to 20 kc. At this counter drive frequency the 1, 2, 4 and 8 switches associated with the $\mathbf{10^2}$ decade of the counter remain "on" for intervals of 5, 10, 20 and 40 ms., respectively, and thus become operative to generate counter feedback together with the $\mathbf{10^3}$ switches. $E_{fb}$ is thus increased to 1100 units when the counter reaches a count of 1100. This added feedback decreases the frequency of $f$ to 10 kc., slowing the switches in the $\mathbf{10^1}$ counter decade down to 1.0, 2.0, 4.0 and 8.0 ms. of "on" time, respectively, thus enabling them to generate feedback also.

$E_{fb}$ thereafter increases in units of 10 until the count reaches approximately 1190. At this point the $\mathbf{10^0}$ switches become operative and the final 10 units of $E_{fb}$ are generated in a linear fashion since all of the DAC switches are operative.

By comparing column 5 of the table of FIG. 10*c* with column 5 at the table of FIG. 10*b*, it is seen that, as a function of time, the counter output progresses to the point of convergence, or at least to a count of 1190, in a manner very closely paralleling that exhibited by the counter output generated by the circuit of FIG. 4. The final 10 count units require a greater amount of time since the counter is operating in a completely linear fashion, the same as the prior art converter. Nonetheless, it is to be noted that the overall convergence time for the circuit of FIG. 5 is materially less than that required by the prior art circuit (see FIG. 10*a*).

The above-discussed operation of the converter of FIG. 5 is graphically summarized in FIGS. 6–9. Since the circuit employs a linear transform oscillator, the relationship between $E_e$ and $f$ is linear as depicted by curve B of FIG. 6. However, since the circuit generates non-linear counter feedback $E_{fb}$ is a non-linear function of $E_i - M$ as shown by the curve $E_{fb}'$ of FIG. 8. Concomitantly, $E_e$ is an inverse non-linear function of $E_i - M$ as shown by curve $E_e'$. Because of this latter relationship, $f$ is substantially the same nonlinear function of $E_i - M$ depicted by curve A of FIG. 7, as it is for the circuit of FIG. 4. Thus, $E_e$ is related to time in substantially the same manner (curve A of FIG. 9).

It is to be noted that the differential amplifiers described in connection with both of the above embodiments were assumed to have a gain of one, and that consequently the magnitude of $E_e$ is a 1-for-1 representation of the difference between $E_i$ and $E_{fb}$. In practice it may well be expedient to provide gain in the differential amplifier in order to increase the sensitivity of the polarity detector and to enhance the response characteristics of the VCO. This, of course, would not alter the basic operation of the converters as previously described.

Also, it to be understood that while in the first described embodiment of the invention, linear feedback was employed to control the operation of a non-linear oscillator and in the second described embodiment nonlinear feedback was used to control a linear oscillator one skilled in the art may find it expedient to combine the two approaches in a single conversion circuit employing non-linear feedback to control a non-linear oscillator.

While the invention has been particularly shown and described with reference to preferred embodiments thereof, it will be understood by those skilled in the art that the foregoing and other changes in form and details may be made therein without departing from the spirit and scope of the invention.

We claim:

1. In an analog to digital converter including an input for receiving an analog input signal, a counter having a plurality of cascaded stages and having an output for producing a digital representation approximating the magnitude of said analog input signal, feedback means coupled to said counter output for producing a first signal having a magnitude which is a first function of said digital representation;

difference means coupled to said feedback means and to said analog input for producing a second signal having a magnitude which is a second function of the difference between said first signal and said analog input signal; and oscillator means including control means coupled to said difference means and responsive to said second signal, said oscillator means also be continuously operatively coupled to one of said counter stages for producing drive pulses at a rate which is a third function of the difference between the magnitude of said analog input signal and said digital representation, said third function being substantially nonlinear, so as to improve the convergence speed of said converter.

2. A converter according to claim 1 wherein the value of said third function approaches zero as said difference between the magnitude of said analog input signal and said digital representation approaches zero.

3. A converter according to claim 2 wherein the counter stage to which said oscillator means is coupled is the low-order stage.

4. A converter according to claim 2 further comprising detection means coupled to said difference means and to said counter for conditioning said counter to increment in a first direction when said difference between said analog input signal and said first signal has a first polarity and for conditioning said counter to increment in a second direction when said last-named difference has a second polarity.

5. A converter according to claim 4 wherein said repetition rate is a further function of the magnitude of said second signal, said fourth function being substantially nonlinear.

6. A converter according to claim 5 wherein said fourth function is substantially logarithmic.

7. A converter according to claim 5 wherein said first and second functions are substantially linear functions.

8. A converter according to claim 4 wherein said second function is a substantially nonlinear function.

9. A converter according to claim 2 wherein said feedback means comprises:

a digital to analog converter for producing said first signal from a digital control input; and delay means coupled between said control input and said counter output for causing the magnitude of said first signal to follow said digital representation only after predetermined time intervals.

10. In an analog to digital converter including an input for receiving an analog input signal and output means for producing a digital representation approximating the magnitude of said analog input signal, the combination comprising:

feedback means coupled to said output means for producing a first signal having a magnitude whose rate of change is a substantially nonlinear function of the rate of change of said digital representation, said feedback means including a digital to analog converter means having a plurality of input lines adapted to be energized to produce signals of different magnitudes, said converter circuit further having a plurality of switches associated with said input lines for energizing said input lines in response to signal transitions on a plurality of control lines and further including delay means for coupling said control lines to said counter output lines for rendering said switches operative only upon the expiration of predetermined time delays after said transitions;

difference means coupled to said feedback means and to said analog input for producing a second signal having a magnitude which is a function of the difference between said first signal and said analog input signal; and conversion means coupled between said difference means and said output means for producing a digital signal in response to said second signal.

11. A converter according to claim 10 wherein each of said switches is associated with one of said control lines, and wherein said delay means has a plurality of delay units, each of said delay units being coupled between one of said control lines and one of said counter output lines, and each of said delay units having a different predetermined time delay.

References Cited

UNITED STATES PATENTS

| | | | |
|---|---|---|---|
| 3,264,378 | 8/1966 | Parkinson | 340—347 |
| 2,784,396 | 3/1957 | Kaiser et al. | 340—347 |
| 2,965,891 | 12/1960 | Martin | 340—347 |
| 3,108,266 | 10/1963 | Gordon et al. | 340—347 |
| 3,112,478 | 11/1963 | Ostroff | 340—347 |
| 3,127,601 | 3/1964 | Kaenel | 340—347 |
| 3,189,891 | 6/1965 | Karsh | 340—347 |
| 3,201,781 | 8/1965 | Holland | 340—347 |
| 3,261,012 | 7/1966 | Bentley | 330—347 |
| 3,274,586 | 9/1966 | Lapinski | 340—347 |
| 3,349,390 | 10/1967 | Glassman | 340—347 |

MAYNARD R. WILBUR, Primary Examiner

G. R. EDWARDS, Assistant Examiner

PO-1050 (5/69)

UNITED STATES PATENT OFFICE
CERTIFICATE OF CORRECTION

Patent No. 3,521,269 Dated July 21, 1970

Inventor(s) Everett G. Brooks et al

It is certified that error appears in the above-identified patent and that said Letters Patent are hereby corrected as shown below:

Col. 11, line 4, delete "further" and substitute --fourth--.

Col. 11, line 13, delete "2" and substitute --8--.

Signed and sealed this 29th day of June 1971.

(SEAL)
Attest:

EDWARD M.FLETCHER,JR.
Attesting Officer

WILLIAM E. SCHUYLER, JR.
Commissioner of Patents